US007946206B2

(12) United States Patent
Gomez et al.

(10) Patent No.: US 7,946,206 B2
(45) Date of Patent: May 24, 2011

(54) QUICK-RELEASE SYSTEM

(75) Inventors: Michael Gomez, Aurora, CO (US); Myron L. Jones, Indian Hills, CO (US)

(73) Assignee: RockSmart, LLC, Aurora, CO (US)

( * ) Notice: Subject to any disclaimer, the term of this patent is extended or adjusted under 35 U.S.C. 154(b) by 476 days.

(21) Appl. No.: 11/943,739

(22) Filed: Nov. 21, 2007

(65) Prior Publication Data

US 2009/0129856 A1 May 21, 2009

(51) Int. Cl.
*B26D 1/14* (2006.01)
*F16B 7/00* (2006.01)

(52) U.S. Cl. ............... 83/469; 83/666; 403/167; 29/428

(58) Field of Classification Search .................... 83/469, 83/666, 665, 698.41; 403/167, 383, 347.4; 29/428; 125/15, 14, 35; 451/359, 342, 353, 451/357; 409/234
See application file for complete search history.

(56) References Cited

U.S. PATENT DOCUMENTS

| | | | | |
|---|---|---|---|---|
| 2,497,217 | A * | 2/1950 | Hall | 451/342 |
| 3,186,281 | A * | 6/1965 | Wingen | 83/469 |
| 4,393,626 | A * | 7/1983 | Schroer | 451/342 |
| 4,729,193 | A * | 3/1988 | Gant et al. | 451/342 |
| 6,042,461 | A * | 3/2000 | Pearson | 451/359 |

* cited by examiner

*Primary Examiner* — Ghassem Alie
(74) *Attorney, Agent, or Firm* — Marsh, Fischmann & Breyfogle LLP

(57) ABSTRACT

A thin veneer stone saw and related methods are provided. The thin veneer stone saw includes one or more circular saw blades. A quick release mechanism is disclosed to facilitate changing of saw blades. The quick release mechanism is operative for interconnecting a driven member to a rotating member. In one implementation, the quick release mechanism includes a bearing surface fixedly interconnected to the rotating member, a shaft fixedly interconnected to the rotating member, and a cam plate. The cam plate is disposed a fixed distance away from the bearing surface. The quick release mechanism further includes an adjustable plate that may be disposed between the bearing surface and the cam plate. A distance from the adjustable plate to the cam plate can be adjustable. The quick release mechanism further includes a clamp base that is selectably fixable to the shaft and a cam arm pivotably interconnected to the clamp base.

6 Claims, 8 Drawing Sheets

QUICK-RELEASE SYSTEM

FIELD OF THE INVENTION

This invention relates generally to apparatuses and methods for cutting masonry in general, and more particularly to apparatuses and methods for sawing thin veneer stones from stone blocks.

BACKGROUND OF THE INVENTION

Thin veneer stone is often used as a facing on buildings such as homes and office buildings or in landscaping. A facing made of thin veneer stone may give the appearance of a stone structure such as a wall. The thin veneer stone facing may have an outer decorative side that may be rough hewn or natural in appearance. However, a facing made of thin veneer stone may have advantages over a facing made of full size stones. For example, the thin veneer stone may be lighter, making the materials used in a thin veneer stone facing easier to handle and transport than full-sized stones. The thin veneer stones may also be less expensive to transport to a construction site.

Thin veneer stone may be produced by cutting thin sections from stone blocks with a stone saw. A typical method used to saw a thin veneer section from a stone block is to place the stone block on a flat conveyor and convey the stone block through a single blade sawing station. The single saw blade may be disposed to cut through the entirety of the stone. However, this may result in the saw blade cutting into the surface of the conveyor as it is attempted to cut through the entirety of the stone block. The resulting damage to the conveyor may require the stone saw to be removed from the production flow while the conveyor is repaired or replaced.

A single-blade stone saw may also experience a slowing of the saw blade below a desirable rate of rotation when sawing larger stones. The slowing may be due to the larger contact area between the single saw blade and the stone resulting in increased friction between the single saw blade and the stone being cut. There may be related motor overloading issues where the single saw blade is being rotated by an electric motor when cutting larger stones.

Thin veneer stone saws require frequent saw blade replacement. When a saw blade becomes unusable due to, for example, wear or damage, the stone saw must be shut down while the saw blade is replaced. The saw blade replacement procedure may typically take from 45 to 120 minutes to compete. During this time, the veneer stone saw is incapable of producing thin veneer stone. Such delays may result in idle personnel while the saw blade is being replaced, loss of productivity, not reaching production goals, and/or missing delivery schedules.

SUMMARY OF THE INVENTION

The present invention relates to cutting of masonry. Embodiments described herein relate to apparatuses and methods for cutting thin veneer stone from stone blocks. The thin veneer stone saws may be configured such that the saw blade or saw blades do not come into contact with the conveyor system. In single-blade thin veneer stone saws, this may be accomplished by using a conveyor system with a notch or gap in the conveyor belt that allows an edge of the cutting blade to be disposed below the top surface of the conveyor belt. In this regard, the saw blade may be operable to cut through the entirety of a stone block without damaging the conveyor system.

The thin veneer stone saw may also be configured with multiple saw blades. The thin veneer stone saw may include two blades, wherein the cutting planes of the blades are coplanar. The blades may be arranged such that one cuts through a top portion of the stone block and the other cuts through the remaining portion of the stone block. By using two blades, as opposed top one larger blade, the contact area between the blades and stone block may be reduced, thus enabling improved performance and the ability to cut larger stone blocks. One blade may be disposed above the conveyor surface and the other blade may be disposed below the conveyor system with a portion thereof extending upwards through the conveyor surface.

The thin veneer stone saw may include a quick release mechanism to interconnect the saw blade to the rotational output of the stone saw. The quick release mechanism may allow for a substantial reduction in saw blade changing time, resulting in improved productivity and reduced downtime. The quick release mechanism may require little or no tools and allow a worn or damaged saw blade to be replaced in about 15 minutes or less. The quick release mechanism may be operable to secure other driven members (e.g., other types of saw blades, wheels, etc.) to rotational power sources.

In one aspect, a rock cutting apparatus for cutting thin veneer rock is provided. The apparatus may include at least one circular blade for cutting a rock so as to form a thin veneer having an external, rough rock surface opposite a cut surface thereof. The apparatus may also include a conveyor for conveying the rock relative to the circular blade and a guide for guiding the rock during conveyance and assisting in maintaining a desired positioning of the rock in relation to the circular blade. The apparatus may also include a structure for enabling cutting of the rock to a plane of the conveyor substantially free of contact between the circular blade and the conveyor.

In another aspect, an apparatus for cutting masonry is provided. The masonry cutting apparatus may include a circular cutting blade, a drive system operable to rotate the circular cutting blade, and a conveyor. The conveyor may be operable to convey the masonry relative to the circular cutting blade. The conveyor may have a substantially planar top surface portion for at least partially supporting the masonry when the masonry is in contact with the circular cutting blade. The top surface of the conveyor may have a gap therein corresponding to a position of the circular cutting blade. In this regard, a portion of the circular cutting blade may be positioned below the top surface within the gap. The circular cutting blade may be free from contact with the conveyor.

In an embodiment of the present aspect, the gap in the top surface of the conveyor may be a notch. The notch may be of any appropriate shape to provide clearance for the circular cutting blade within the notch. In another embodiment, the gap may be formed between two separate sections of the conveyor. The two sections of the conveyor may each move at the same rate of speed to convey the masonry to be cut.

In still another aspect, an apparatus for sawing masonry is provided. The masonry sawing apparatus may include a first circular saw blade, a second circular saw blade, and a drive system operable to rotate the first and second circular saw blades. The first and second circular saw blades may each lie within a sawing plane. The masonry sawing apparatus may further include a conveyor system operable to convey the masonry relative to the first and second circular saw blades. The conveyor system may have a substantially planar top surface portion for at least partially supporting the masonry when the masonry is in contact with at least one of the first and second circular saw blades. The first and second circular saw blades may be free from contact with the conveyor system. An entirety of the first circular saw blade may be positioned above the substantially planar top surface portion. A first part of the second circular saw blade may be positioned above the substantially planar top surface portion and a second part of the second circular saw blade may be positioned below the substantially planar top surface portion. The first part may be smaller than the second part. A portion of the first circular saw blade may be positioned closer to the substantially planar top surface portion than a portion of the second circular saw blade.

In an embodiment of the present aspect, the masonry may, for example, be any one of, or combination of the following: brick, stone, rock, and concrete block. In an embodiment, the second circular saw blade may be disposed between two conveyor sections of the conveyor system. The first and second circular saw blades may be perpendicular to the substantially planar top surface portion.

In an embodiment, the apparatus for sawing masonry may further include a hydraulic power source that powers the drive system. The hydraulic power source may also power the conveyor system. The hydraulic power source may be operable to provide power to multiple sets of the first and second circular saw blades, and multiple conveyor systems. For example, a production facility may include multiple sets of circular saw blades and conveyors to simultaneously process multiple pieces of masonry.

In an embodiment, the first and second circular saw blades may be adjustable within the sawing plane relative to the substantially planar top surface portion. The adjustability may be in a direction perpendicular to the top surface portion. The first and second circular saw blades may be adjusted such that each may saw into the masonry positioned on the substantially planar top surface portion to a depth of greater than 12 inches. For example, where the masonry has a dimension of 24" in the direction perpendicular to the top surface portion, each circular saw blade may be operable to saw into the masonry more than half way. In this example, the first part of the second circular saw blade may extend greater than 12 inches above the top surface portion, while the distance between the bottom of the first circular saw blade and the top surface portion may be less than 12 inches.

In an arrangement, the apparatus for sawing masonry may further include a fence for guiding the masonry during conveyance along the conveyor system. The fence may be positioned parallel to a sawing direction of the first and second circular saw blades. A distance between the fence and the second circular saw blade may correspond to a thickness of a portion of the masonry to be sawed from the masonry by the apparatus. The distance between the fence and the second circular saw blade may be adjustable. The first and second circular saw blades, the conveyor system, and the fence may be interconnected to a frame. The frame may be tiltable. The frame may be tiltable such that the masonry to be sawed may be at least partially supported by the fence. The frame may be tiltable such that the portion of the masonry to be sawed from the masonry is at least partially supported by the fence.

In another aspect, a method of cutting a thin veneer stone from a stone is provided. The method may include adjusting a distance between a cutting plane and a fence, wherein the distance corresponds to a desired thickness of the thin veneer stone. The method may further include loading a stone onto a conveyor system and aligning the stone with respect to the cutting plane after the loading step. The stone may then be conveyed, along the conveyor system, relative to the cutting plane and the fence after the aligning step. The method may further include simultaneously cutting the stone with lower and upper circular cutting blades during the conveying step, wherein a center of the lower circular cutting blade may be disposed below the stone and a center of the upper circular cutting blade may be disposed above the stone. The circular cutting blades may be disposed within the cutting plane.

In an embodiment of the current method, the conveyor system, the fence, and the upper and lower circular cutting blades may be interconnected to a frame, and the method may further include adjusting a tilt angle of the frame. In an embodiment, the method may further include adjusting a position of the lower and upper circular cutting blades relative to the conveyor system.

A speed of the conveyor system may be adjusted based on a rotational speed of at least one of the lower and upper circular cutting blades. For example, if one of the circular cutting blades begins to slow beyond a predetermined rate due to contact with the stone, the conveyor system may be slowed down to allow the rotational speed of the cutting blade to recover.

The method may further include separating the thin veneer stone from the stone after the cutting step with a separation blade. In an embodiment wherein the cutting step separates the thin veneer stone from the stone, the method may further comprise, after the cutting step, repeating the loading, aligning, conveying, and cutting steps to cut another thin veneer stone from the stone.

In still another aspect, a quick release mechanism for interconnecting a driven member to a rotating member is provided. The quick release mechanism may include a bearing surface fixedly interconnected to the rotating member, a shaft fixedly interconnected to the rotating member, and a cam plate. The cam plate may be disposed a fixed distance away from the bearing surface. The quick release mechanism may further include an adjustable plate that may be disposed between the bearing surface and the cam plate. A distance from the adjustable plate to the cam plate may be adjustable. The quick release mechanism may further include a clamp base that may be selectably fixable to the shaft and a cam arm pivotably interconnected to the clamp base. The cam arm may be configured such that when the clamp base is fixed to the shaft, the cam arm may be operable to pivot a cam from a first position where the cam may be not in contact with the cam plate to a second position where the cam may be in contact with the cam plate. The quick release mechanism may further include a cam movement prevention member operable to selectably prevent the cam from moving relative to the cam plate when the cam is in the second position.

In an embodiment, the bearing surface may include an alignment pin operable to align the driven member with the rotating member. In an embodiment, the rotating member may be fixedly interconnected to an output of a rotational power source. In an arrangement, the shaft may include two holes spaced from, and lying in a plane parallel to, a plane containing a longitudinal axis of the shaft. In an embodiment, a face of the adjustable plate facing the bearing surface may have a compressible surface. The compressible surface may be comprised of, for example, plastic and/or rubber.

In an arrangement of the quick release mechanism, the adjustable plate may have one of male threads or female threads and the cam plate may have the corresponding other of male threads and female threads such that the adjustable plate and the cam plate may be screwed together. The distance between the adjustable plate and the cam plate may be adjustable by rotating one of the cam plate and the adjustable plate relative to the other.

The clamp base and the shaft may each have a first set of corresponding holes and the clamp base may be fixed to the shaft by a first pin disposed in the first set of corresponding holes. Furthermore, the clamp base and the shaft may have a second set of corresponding holes, wherein the cam movement prevention member may be a second pin disposed in the second set of corresponding holes.

In an embodiment, the cam, when in the second position, may exert a force on the cam plate when the driven member is disposed between the adjustable plate and the bearing surface.

In an embodiment, the quick release mechanism may further include a second cam arm pivotably interconnected to the clamp base. When the clamp base is fixed to the shaft the second cam arm may be operable to pivot a second cam from a second cam first position where the second cam is not in contact with the cam plate to a second cam second position where the second cam is in contact with the cam plate.

In an arrangement, the driven member may be a saw blade. The saw blade may be a stone saw blade.

In another aspect, a method of attaching a driven member to a rotating member is provided. The method may include setting a distance between an adjustable plate and a cam plate, placing the driven member onto the rotating member, installing the adjustable plate and the cam plate onto the rotating member after the setting and placing steps, fixing a clamp assembly to the rotating member after the installing step, adjusting a position of a cam of the clamp assembly such that the cam contacts the cam plate, and locking the cam into place after the adjusting step. The setting step may include rotating one of the adjustable plate and the cam plate relative to the other.

In an embodiment, the fixing step may further comprise inserting a pin through the clamp assembly and the rotating member. In an arrangement, the adjusting step may further include pivoting a cam arm interconnected to the cam to bring the cam into contact with the cam plate. In an arrangement, the locking step may further comprise inserting a pin through the clamp assembly and the rotating member.

Further areas of applicability of the present invention will become apparent from the detailed description provided hereinafter. The various features, arrangements and embodiments discussed above in relation to each aforementioned aspect may be utilized by any of the aforementioned aspects. It should be understood that the detailed description and specific examples, while indicating a preferred embodiment of the invention, are intended for purposes of illustration only and are not intended to limit the scope of the invention.

BRIEF DESCRIPTION OF THE DRAWINGS

For a more complete understanding of the present invention and further advantages thereof, reference is now made to the following Detailed Description taken in conjunction with the accompanying drawings, wherein.

DETAILED DESCRIPTION OF THE INVENTION

In the following description, an embodiment of the invention is set forth in detail in the context of a system for sawing thin veneer stone and related methods. Indeed, the invention has a number of benefits and provides useful results in this regard. However, it will be appreciated that various aspects of the present invention are not limited to such thin veneer stone sawing applications. Accordingly, the following description should be understood as exemplifying the invention and not by way of limitation.

Figure 1:
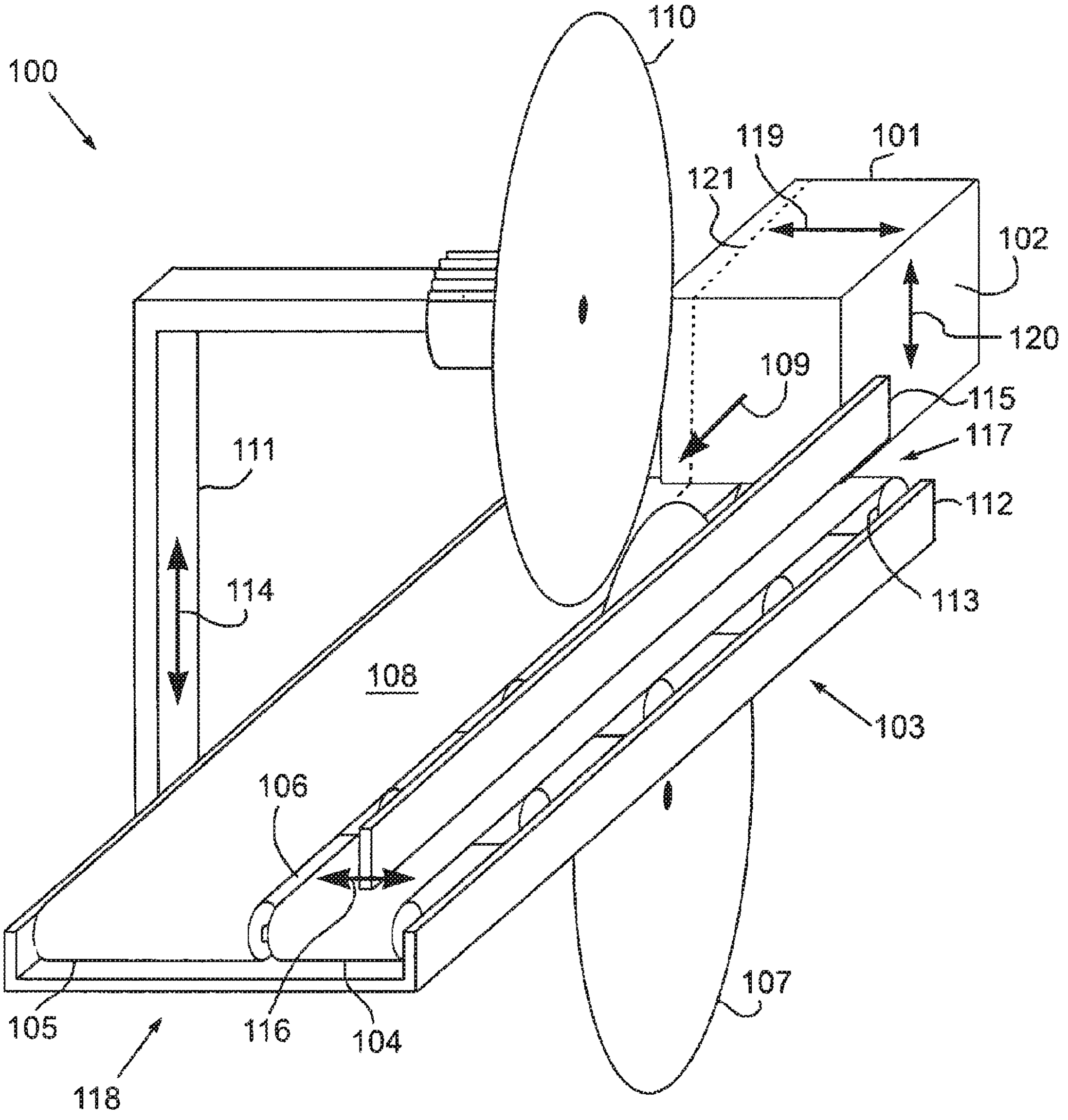
FIG. 1 is an orthogonal schematic view of a portion of an embodiment of a thin veneer stone saw.

Referring to FIG. 1, a thin veneer stone saw 100 saws thin veneer stones from larger blocks, such as stone block 101. Although described in the context of sawing stone block 101, the thin veneer stone saw 100 may be operable to saw various other types of masonry, including, but not limited to, rock, brick, and concrete block. Stone block 101 may have a textured surface 102 which may form an outer decorative surface of the thin veneer stone after it is sawed from the stone block 101. The textured surface 102 may be a natural surface of the stone or a rough surface formed as a result of the quarrying process. The textured surface 102 may be an artificially formed surface. The thin veneer stone saw 100 may also be operable to saw stone blocks 101 where the textured surface 102 is generally smooth.

The thin veneer stones may be used as building or landscaping materials. For example the thin veneer stones may be used to construct a stone facade on a building. The resulting stone facade may be considerably lighter in weight than an equivalent stone facade made from full-sized stones.

To saw the stone block 101, the stone block 101 may be placed on a conveyor system 103. Conveyer system 103 may comprise two separate conveyer drive belts 104, 105 with a space 106 between them. The space 106 may allow clearance for a portion of a lower circular saw blade 107 to extend between the two separate conveyer drive belts 104, 105. Thus a portion of the lower circular saw blade 107 may extend above a substantially planar top surface portion 108 ("top surface 108") of the conveyor system 103. Although shown in equal length, the conveyer drive belt 104 may be of a different length than the conveyer drive belt 105.

The stone block 101 may be fed onto a feed end 117 of the conveyor system 103. The conveyer drive belt 104 may convey the thin veneer stone to a discharge end 118 after it is sawed from the stone block 101 for subsequent processing and/or inspection. Contemporaneously, the conveyer drive belt 105 may convey the remaining portion of the stone block 101 (after the thin veneer stone has been sawed from the stone block 101) to the discharge end 118 for subsequent processing anchor disposal. As will be appreciated, by positioning the lower circular saw blade 107 in the space 106 between the two separate conveyer drive belts 104, 105, the lower circular saw blade 107 will not cut into or damage either of the conveyer drive belts 104, 105.

The conveyor system 103 may include a conveyer support frame 112. The conveyer support frame 112 may support various rollers 113 and other components of the conveyor system 103.

The conveyance speed of the conveyor system 103 may, for example, be adjustable from 0 to 15 feet per minute. In this regard, the speed of the conveyor system 103 may be adjusted to accommodate varying sawing speeds. The conveyor system 103 may also be operable to run in a forward direction, as indicated by directional arrow 109, and a reverse direction (opposite of directional arrow 109). The reverse direction may be used to, for example, clear jammed material from the blade area.

The conveyor system 103 may convey the stone block 101 such that it comes into contact with, and is sawed by, the lower circular saw blade 107 and an upper circular saw blade 110. The circular saw blades 107, 110 may be constructed of steel with diamond tip segments. The circular saw blades 107, 110 may, for example, be about 40 inches in diameter and 3⁄16 inches thick. It will be appreciated that other diameters and thicknesses may be used.

Figure 2:
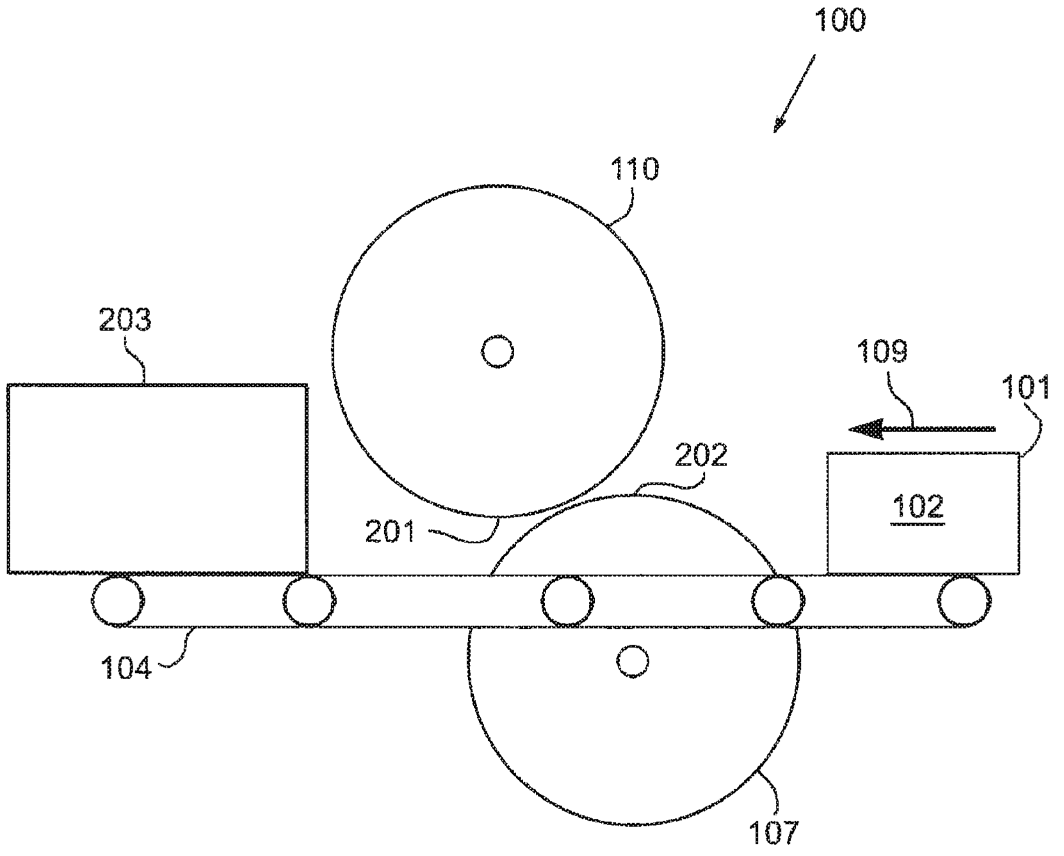
FIG. 2 is a right side schematic view of a portion of the thin veneer stone saw of FIG. 1.
Figure 3:
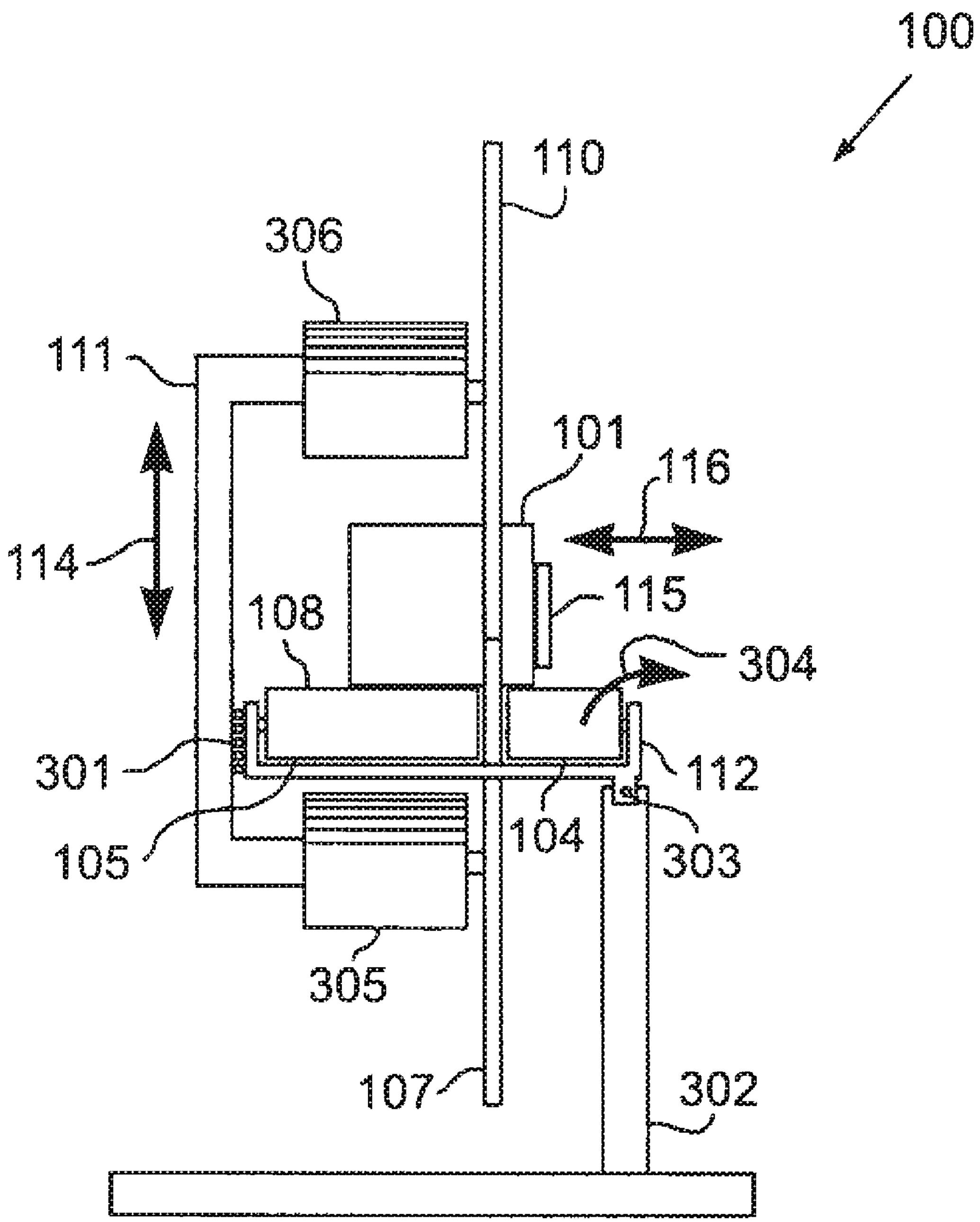
FIG. 3 is a front schematic view of a portion of the thin veneer stone saw of FIG. 1.

FIG. 2 is a right side schematic view of a portion of the thin veneer stone saw 100. As illustrated, the circular saw blades 107, 110 may be offset relative to each other such a that the center of the upper circular saw blade 110 is not positioned directly above the center of the lower circular saw blade 107 when viewed as shown in FIG. 2. The circular saw blades 107, 110 may occupy substantially the same sawing plane as illustrated in FIG. 3. Returning to FIG. 2, the upper circular saw blade 110 may have a lowest point 201 that is below the highest point 202 of the lower circular saw blade 107. In this regard, as the stone block 101 is sawed by the circular saw blades 107, 110, a continuous cut through the stone block 101 may be performed. For example, the lower and upper circular saw blades 107, 110 may be positioned such that the upper circular saw blade 110 saws through slightly over half of the thickness of the stone block 101 (from the top side of the stone block 101) and the lower circular saw blade 107 saws through slightly over half of the thickness of the stone block 101 (from the bottom side of the stone block 101).

To accommodate stone blocks 101 of various thicknesses, the position of the circular saw blades 107, 110 may be adjustable relative to the top surface 108. In this regard, returning to FIG. 1, the lower circular saw blade 107 and upper circular saw blade 110 may be interconnected to each other by a blade support frame 111. The blade support frame 111 may be operable to be raised or lowered as indicated by directional arrow 114. This adjustability may be achieved in any appropriate manner. For example, as shown in FIG. 3, the blade support frame 111 may be interconnected to the conveyer support frame 112 through a linear bearing 301 that allows movement in the direction of directional arrow 114.

When sawing stone blocks 101 of various thicknesses, the position of the circular saw blades 107, 110 may be adjusted such that each of the circular saw blades 107, 110 saws through approximately half of the thickness of the stone block 101. In this regard, the total area of the circular saw blades 107, 110 that may be disposed within the stone block 101 during the sawing process is significantly less than the total area that would be disposed within the stone block 101 if the stone block 101 were being sawed with a single circular blade. Additionally, the thin veneer stone saw 100 using two circular saw blades 107, 110, can saw through a particular thickness of the stone block 101 using two circular saw blades 107, 110 that may each be smaller than the diameter of a single circular saw blade that would be required if the stone block 101 were to be sawed through with a single blade system. Moreover, the thin veneer stone saw 100 using two circular saw blades 107, 110, as compared to a single blade system using a single blade that is equal in diameter to one of the two circular saw blades 107, 110, may be operable to saw through a thicker stone block 101. In this regard, in the embodiment described above where the two circular saw blades 107, 110 are each 40 inches in diameter, the thin veneer stone saw 100 may be operable to saw stone blocks 101 of up to 24 inches in thickness. For example, the total size of the stone block 101 to be processed may be 24 inches long (as measured along direction 109) by 24 inches thick (as measured along direction 120) by 12 inches deep (as measured along direction 119).

Returning to FIG. 1, a fence 115 may be used to guide the stone block 101 along the conveyor system 103 during the sawing process. The stone block 101 may remain in contact with the fence 115 as it travels along the conveyor system 103. The fence 115 may, for example, consist of an elongated metal plate. The distance between the fence 115 and the sawing plane of the circular saw blades 107, 110 may be adjustable, as indicated by directional arrow 116. The thickness of the thin veneer stone to be sawed from the stone block 101 may correlate to distance between the fence 115 and the sawing plane of the circular saw blades 107, 110. In an exemplary embodiment, the position of the fence 115 may be adjustable to produce thin veneer stones with a thickness between ½ inch and 7 inches.

Turning to FIG. 3, and as noted earlier, the conveyor system 103 may include a conveyer support frame 112 and a blade support frame 111 may be interconnected to the conveyer support frame 112. The conveyer support frame 112 may be pivotably interconnected to a base 302. In this regard, the conveyer support frame 112 may be operable to pivot about a pivot axis 303. For example, relative to the position shown in FIG. 3, the conveyer support frame 111 may be operable to rotate in a clockwise direction 304. This may result in the entire conveyer system 103 along with the blade support frame 111 and the circular saw blades 107, 110, being tilted. Tilting may assist in keeping the stone block 101 in contact with the fence 115 as the stone block 101 moves along the conveyor system 103. Furthermore, once the thin veneer stone is separated from the stone block 101, the thin veneer stone may be partially supported by the fence 115 as the thin veneer stone travels along the conveyor system 103. In this manner, the position of the thin veneer stone and the stone block 101 after the sawing process may be controlled. The frame, for example, may be operable to be tilted between 0 and 20 degrees.

To assist in separating the stone block 101 from the thin veneer stone after the sawing process, a separation blade 203 (the separation blade 203 is shown in FIG. 2, the separation blade 203 is not shown in FIGS. 1 and 3) may be disposed downstream of the circular saw blades 107, 110. The separation blade 203 may be a stationary blade operable to fit between the thin veneer stone and the stone block 101 after the thin veneer stone has been sawed from the stone block 101. As the stone block 101 travels along the conveyor system 103, it may move relative to the separation blade 203 such that the separation blade 203 enters into channel cut by the circular saw blades 107, 110. As the separation blade 203 penetrates deeper into the stone block 101, the thin veneer stone and the stone block 101 may be separated. The separation blade 203 may also partially support the stone block 101 as it travels along the conveyor system 103 after it has been sawed. The separation blade 203 may assist in separating the thin veneer stone from the stone block 101 and direct each component to its respective next manufacturing process step. The plate may, for example, be constructed of an abrasion resistant ("AR") steel.

Water may be sprayed through nozzles onto the circular saw blades 107, 110 and stone block 101 during the sawing process. The water may cool the circular saw blades 107, 110 and/or flush cutting debris from the stone block 101 and circular saw blades 107, 110. The water may be sprayed from nozzles strategically placed to lubricate and cool the circular saw blades 107, 110.

As shown in FIG. 3, the circular saw blades 107, 110 may be driven by motors 305, 306 respectively. Any other appropriate means of driving the circular saw blades 107, 110 may be utilized. For example, the circular saw blades 107, 110 may both be driven by a single rotational power source interconnected to the circular saw blades 107, 110 via a rotational interconnection, such as a gear train or drive belts. The circular saw blades 107, 110 may be interconnected to the output of the motors 305, 306 (or other source of rotational power) via a quick release mechanism (not shown in FIG. 3). In this regard, the quick release mechanism may allow for rapid changing of the circular saw blades 107, 110.

Figure 6:
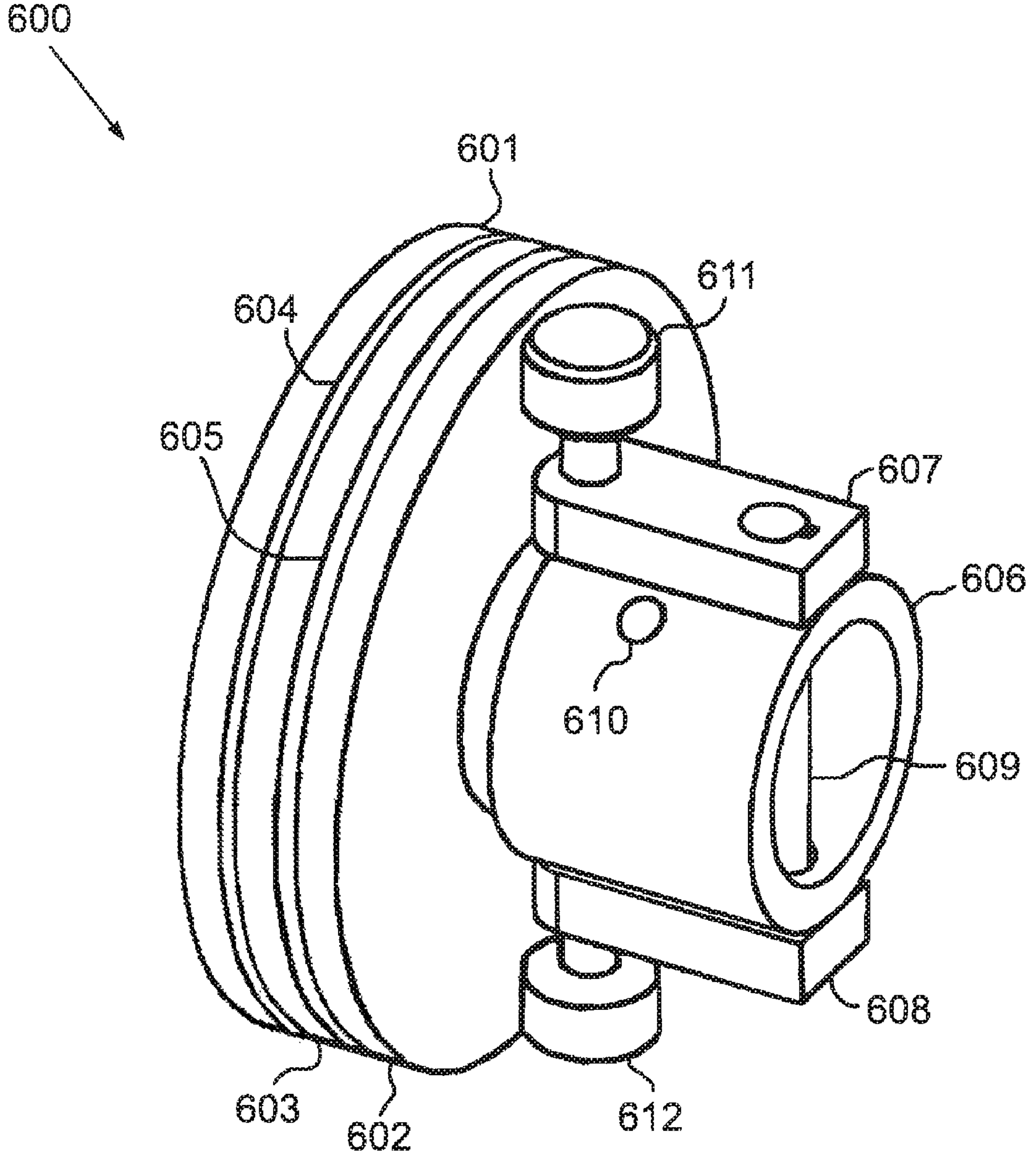
FIG. 6 is an isometric view of an embodiment of a quick release mechanism.
Figure 7:
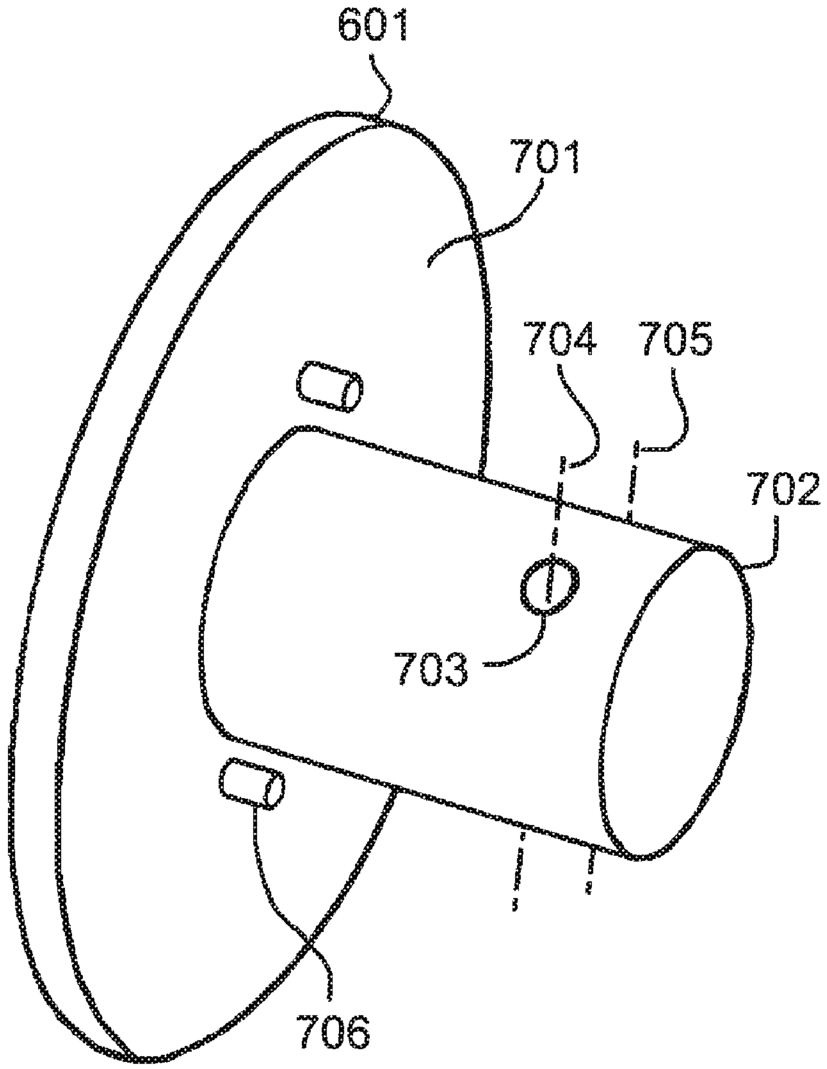
FIG. 7 is an isometric view of a mounted plate of the quick release mechanism of FIG. 6.

FIG. 6 illustrates a quick release mechanism 600 that may be used in the thin veneer stone saw 100. The quick release mechanism 600 includes a mounted plate 601. Generally, the mounted plate 601 may be fixedly interconnected to the output of a rotational power source such as a saw motor (e.g., lower motor 305, upper motor 306). Details of the mounted plate 601 are illustrated in FIG. 7. The mounted plate 601 may include a boss 702 extending from the plate portion 701 of the mounted plate 601. The boss 702 may be a solid shaft as illustrated in FIG. 7 or it may be a hollow shaft or of any other appropriate construction. The boss 702 may include a pair of through holes 703 that extended through the boss 702. The through holes 703 may be aligned along through hole axes 704, 705. The through hole axes 704, 705 may, for example, be parallel to each other and each may be offset from the central axis of the boss 702. Any other appropriate location for the through hole axes 704,705 that provides the functionality described herein may be utilized. The mounted plate 601 may also include one or more mounting pins 706. The mounted plate 601 may also include other features not illustrated in FIG. 7, such as, for example, mounting holes (e.g., through the plate portion 701) that he can be used to interconnect the mounted plate 601 to the output of a rotational power source.

A driven member, such as a stone saw blade, may have one or more holes that correspond to the boss 702 and the mounting pins 706 on the mounted plate 601. Hereinafter, the quick release mechanism 600 will be described in terms of mounting a stone saw blade. However it would be appreciated that the quick release mechanism 600 may be used to mount other types of driven members to a rotational power source. The center of the stone saw blade may be slipped over the boss 702 and pressed up against the plate portion 701 of the mounted plate 601. The holes in the stone saw blade may be slipped over the mounting pins 706. This serves to align the stone saw blade with the mounted plate 601 and to transfer rotational motion from the quick release mechanism 600 to the stone saw blade.

Returning to FIG. 6, after the stone saw blade is placed over the mounted plate 601, a subassembly consisting of a cam plate 602 and an adjustable plate 603 may be positioned over the boss 702 as shown in FIG. 6. Accordingly, the stone saw blade may be positioned within a blade gap 604 between the adjustable plate 603 and the mounted plate 601. Prior to placing the subassembly over the boss 702, the adjustment gap 605 between the adjustable plate 603 and the cam plate 602 may be adjusted. The adjustment may be based on the thickness of the stone saw blade to be mounted. For example, for relatively thicker stone saw blades, the adjustable plate 603 may be adjusted so that it is relatively closer to the cam plate 602. Along these lines, for relatively thinner stone saw blades, the adjustable plate 603 may be adjusted so that it is relatively further away from the cam plate 602. In this regard, once assembled, the cam plate 602 will generally be the same distance away from the mounted plate 601 regardless of the thickness of the stone saw blade that is being mounted. Any variation in the thickness of the stone saw blade may be accounted for by the adjusting of the adjustable plate 603.

The adjustment of the position of the adjustable plate 603 relative to the cam plate 602 may be achieved in any appropriate manner. In one exemplary manner, the cam plate 602 may have an externally threaded central boss extending toward the adjustable plate 603. The adjustable plate 603 may have a corresponding internally threaded central opening. Accordingly, by interconnecting the adjustable plate 603 and the cam plate 602 at the threads and rotating the adjustable plate 603 relative to the cam plate 602, the adjustment gap 605 may be adjusted.

The adjustable plate 603 may include a compressible member (not visible in FIG. 6) attached to the surface of the adjustable plate 603 facing the mounted plate 601. The compressible member may be pressed up against the stone saw blade. The compression of the compressible member may compensate for any dimensional variations such as, for example, variations in the thickness of the stone saw blade and variations in the adjusting of the adjustment gap 605.

The cam plate 602 may be held in position by cams 611, 612. Cams 611, 612 may be interconnected to a clamp base 606 via an upper cam arm 607 and a lower cam arm 608, respectively. The interconnection between the clamp base 606 and the upper and lower cam arms 607, 608 may allow the upper and lower cam arms 607, 608 to pivot about a cam pivot 609. The cams 611, 612 may be prevented from pivoting away from the cam plate 602 by a pair of pins disposed in and protruding from through holes, such as pin hole 610 and previously described through hole 703, in the clamp base 606 and the boss 702 respectively. The pair of pins may be disposed along both sides of the upper and lower cam arms 607, 608 and thus prevent the upper and lower cam arms 607, 608 from pivoting away from the position illustrated in FIG. 6.

To further illuminate the quick release mechanism 600 of FIG. 6, a process of mounting a stone saw blade using the quick release mechanism 600 will now be described. As noted, the mounted plate 601 may be mounted to the rotational power output of a motor. The first step in a method may be to adjust the distance between the cam plates 602 and the adjustable plate 603 to correspond with the thickness of the stone saw blade to be mounted. This adjustment may be achieved by rotating the adjustable plate 603 relative to the cam plate 602. The next step in the process may be to place the stone saw blade onto the boss 702 and up against the plate portion 701 of the mounted plate 601 such that the mounting pins 706 are disposed within corresponding holes in the stone saw blade.

The next step may be to install the previously adjusted cam plate 602 and adjustable plate 603 subassembly over the boss 702 such that the compressible member attached to the adjustable plate 603 is in contact with the stone saw blade. The next step may be to place the clamp base 606 over the boss 702. At this point in the process, the upper and lower cam arms 607, 608 may be pivoted such that they are disposed 90 degrees from the position shown in FIG. 6. The next step may be to insert a first pin through one of the holes (e.g., the through hole along through hole axis 705) in the clamp base 606 and a corresponding hole through the boss 702. In this regard, this first pin may secure the clamp base 606 to the boss 702 and prevent relative motion therebetween.

The next step may be to pivot the upper and lower cam arms 607, 608 such that the cams 611, 612 come in contact with the cam plate 602 and press the cam plate 602 and adjustable plate 603 subassembly against the stone saw blade. A specialized tool may be used to grasp the upper and lower cam arms 607, 608 during this step. The specialized tool may allow the installer to apply additional torque when repositioning the upper and lower cam arms 607, 608 (e.g., in a manner similar to using a wrench). After such pivoting, the upper and lower cam arms 607, 608 will be positioned as shown in FIG. 6. The final step in the installation of the stone saw blade may be to insert a second pin through the second hole in the clamp base 606 (e.g., along through hole axis 704) thereby capturing the upper and lower cam arms 607, 608 between the first and second pins and thus preventing the upper and lower cam arms 607, 608 from pivoting away from the position illustrated in FIG. 6. The process may be reversed to remove the stone saw blade from the quick release mechanism 600.

The quick release mechanism 600 has been described in relation to a stone saw blade retention application in the thin veneer stone saw 100. It should be appreciated that the quick release mechanism may be used in other applications, such as other saw blade applications, other tool applications and other applications where a driven member is required to be interconnected to a source of rotational motion.

Returning to FIG. 1, the thin veneer stone saw 100 may include an alignment guide. The alignment guide may be disposed to project light (e.g., a laser beam) in the form of an alignment line 121 onto the stone block 101 proximate to the feed end 117 of the thin veneer stone saw 100 and may assist in the alignment of the stone block 101 for sawing. The alignment line 121 may clearly communicate to a person loading the stone block 101 how the stone block 101 is aligned relative to the cutting plane of the circular saw blades 107, 110. Using the alignment line 121 as a guide, the person loading the stone block may adjust the position of the stone block 101 on the top surface 108 such that the location of the cut through the stone block 101 (as indicated by the alignment line 121) is satisfactory.

Various portions of the thin veneer stone saw 100 may be powered using hydraulic power. Blade drive motors 305, 306 may be hydraulic motors capable of converting hydraulic pressure into rotational movement of the circular saw blades 107, 110. Accordingly, hydraulic lines may be interconnected between the drive motors 305, 306 and a source of hydraulic power. The conveyor system 103 may be powered by hydraulic power. The conveyor system 103 may be interconnected to the same hydraulic power source as the drive motors 305, 306. The raising and lowering of the circular saw blades 107, 110 interconnected to the blade support frame 111 may also be achieved through hydraulic power. Furthermore, the tilting of the conveyor support frame 112 may be hydraulically powered (e.g. the conveyor support frame 112 may be tilted by a hydraulically driven jackscrew). The positioning of the fence 115 may be performed using hydraulic power.

Other sources of power, such as, for example, electric motors or pneumatic motors may be used to power any of the aforementioned systems. Furthermore, various systems may use different sources of power; for example, the circular saw blades 107, 110 may be powered by hydraulic motors while the conveyor system 103 may be powered by one or more electric motors. Where appropriate (e.g., adjustment of the position of the fence 115) the various systems may be unpowered and adjusted and/or repositioned manually.

The thin veneer stone saw 100 may include a control panel. The control panel may provide operators and maintenance personnel with access to various automatic and manual systems. The control panel may provide an interface where an operator and/or maintenance person may be able to input the size and/or type of stone to be sawed. The control panel may provide operators with a simple control interface that may be used during normal operations. Furthermore, the control panel may provide maintenance personnel with a more sophisticated control interface that may provide greater information as to the status of the system and also allow the system to be run in a manual mode. The control panel may also be operable to display various operational parameters of the system such as a run-time clock, machine utilization, machine performance, and an assessment of predicted mean time between failures. The control panel may be operable to output an alarm in the case of current and/or potential system problems.

The control panel may also provide an interface to communicate stored information to an operator and/or maintenance person. For example, the control panel may be operable to display an image of an operating manual, trouble shooting guide, and parts list.

The thin veneer stone saw 100 may include automated control functionality. For example, the thin veneer stone saw 100 may be operable to monitor the speed of the circular saw blades 107, 110 and/or the conveyor system 103 and adjust the speed of the circular saw blades 107, 110 (either individually or in unison) and/or the conveyor system 103 to improve the performance of the thin veneer stone saw 100.

For example, the control system may detect that the rotational speed of the circular saw blades 107, 110 has fallen below a preset level. The control system may then reduce the conveyance speed of the conveyor system 103 to compensate for the reduction in rotational speed of the circular saw blades 107, 110. In another example, the control system may detect that the rotational speed of the circular saw blades 107, 110 has increased over a preset level. The control system may then increase the conveyance speed of the conveyor system 103, thus increasing the throughput of the thin veneer stone saw 100.

The thin veneer stone saw 100 may include an outer enclosure around the circular saw blades 107, 110 and various other moving parts to reduce the likelihood of an injury to an operator or other personnel. Furthermore, emergency stop buttons may be placed at appropriate locations (e.g., at both ends of the machine and at the control panel) to allow operators and other personnel to quickly deactivate the thin veneer stone saw 100.

The thin veneer stone saw 100 may be configured so that it is transportable. For example, the thin veneer stone saw 100 may be sized to fit on to a standard tractor-trailer. Additionally, the thin veneer stone saw 100 may be capable of operation while situated on the tractor-trailer or other means of transportation. Moreover, the thin veneer stone saw 100 may be capable of being offloaded from the means of transportation and operated at a remote site (e.g., a construction site). Splitting, packaging, and other processing equipment may accompany the thin veneer stone saw 100 when being transported and/or operated at a remote site. In this regard, an entire production system that includes at least one thin veneer stone saw 100 and other processing equipment may be mobile.

Figure 4A:
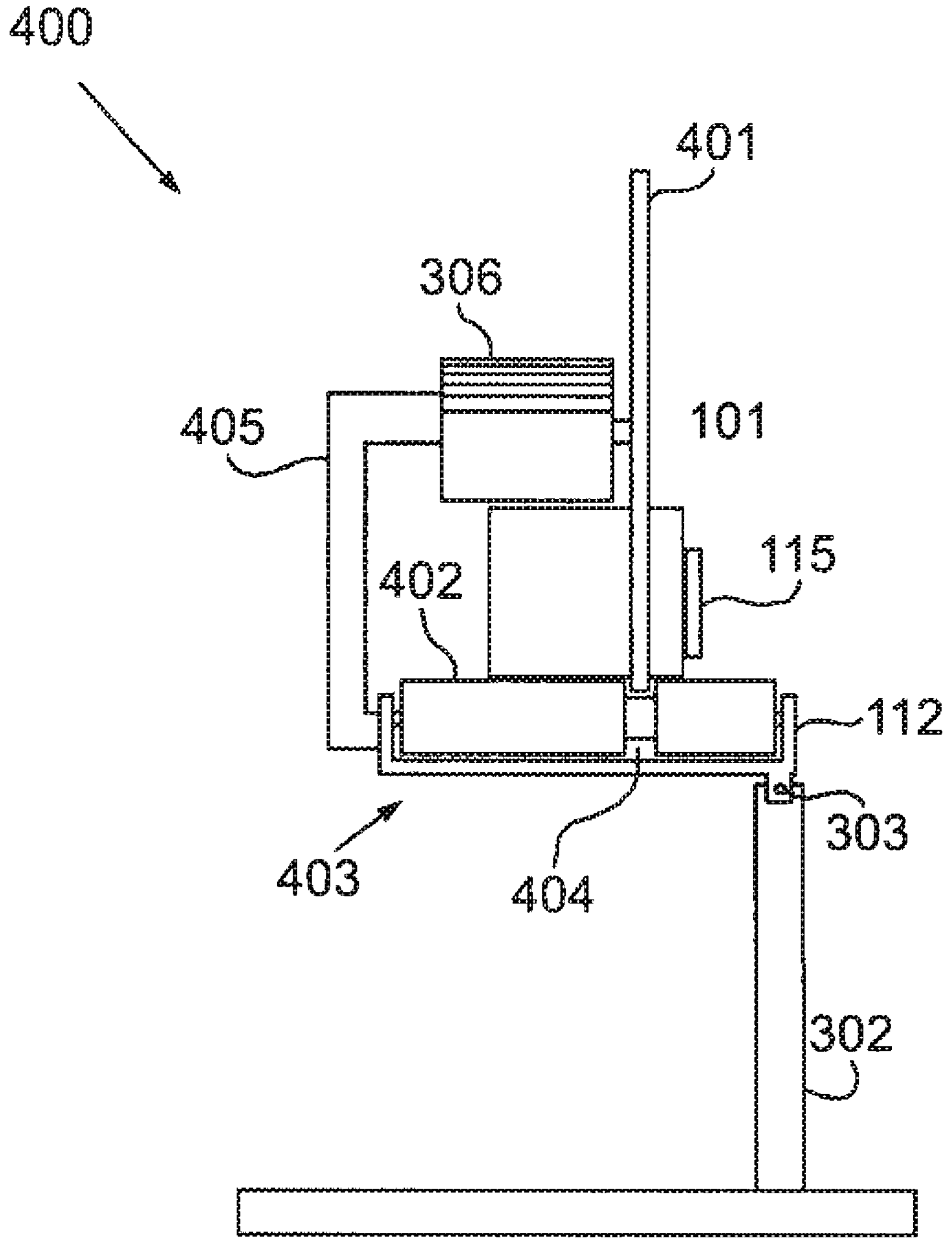
FIG. 4*a* is a front schematic view of a portion of another embodiment of a thin veneer stone saw.

FIG. **4*a* illustrates an alternate embodiment of a thin veneer stone saw 400. Components of the thin veneer stone saw 400 that are similar to components of the thin veneer stone saw 100 of FIG. 1 are identified using common reference numbers. The thin veneer stone saw 400 of FIG. 4*a* is operable to saw a stone block 101 using a single circular saw blade 401. The circular saw blade 401 is disposed such that a portion of the circular saw blade 401 is disposed below a substantially planar top surface 402 of a conveyor system 403. As illustrated in FIG. 4***a*, this may be achieved by virtue of a notch 404 in the conveyor system 403. The circular saw blade 401 may be aligned with the notch 404 and a portion of the circular saw blade 401 may be disposed within the notch 404. The circular saw blade 401 may be driven by the motor 306. The motor 306 may be supported by a motor support frame 405 interconnected to the conveyor system 403.

The notch 404 may be sized and shaped, and the circular saw blade 401 may be positioned, such that the circular saw blade 401 does not come into contact with any portion of the conveyor system 403. In this regard, the thin veneer stone saw 400 may be operable to saw completely through stone blocks 101 without incurring damage to the conveyor system 403 due to contact between the circular saw blade 401 and the conveyor system 403.

Figure 4B:
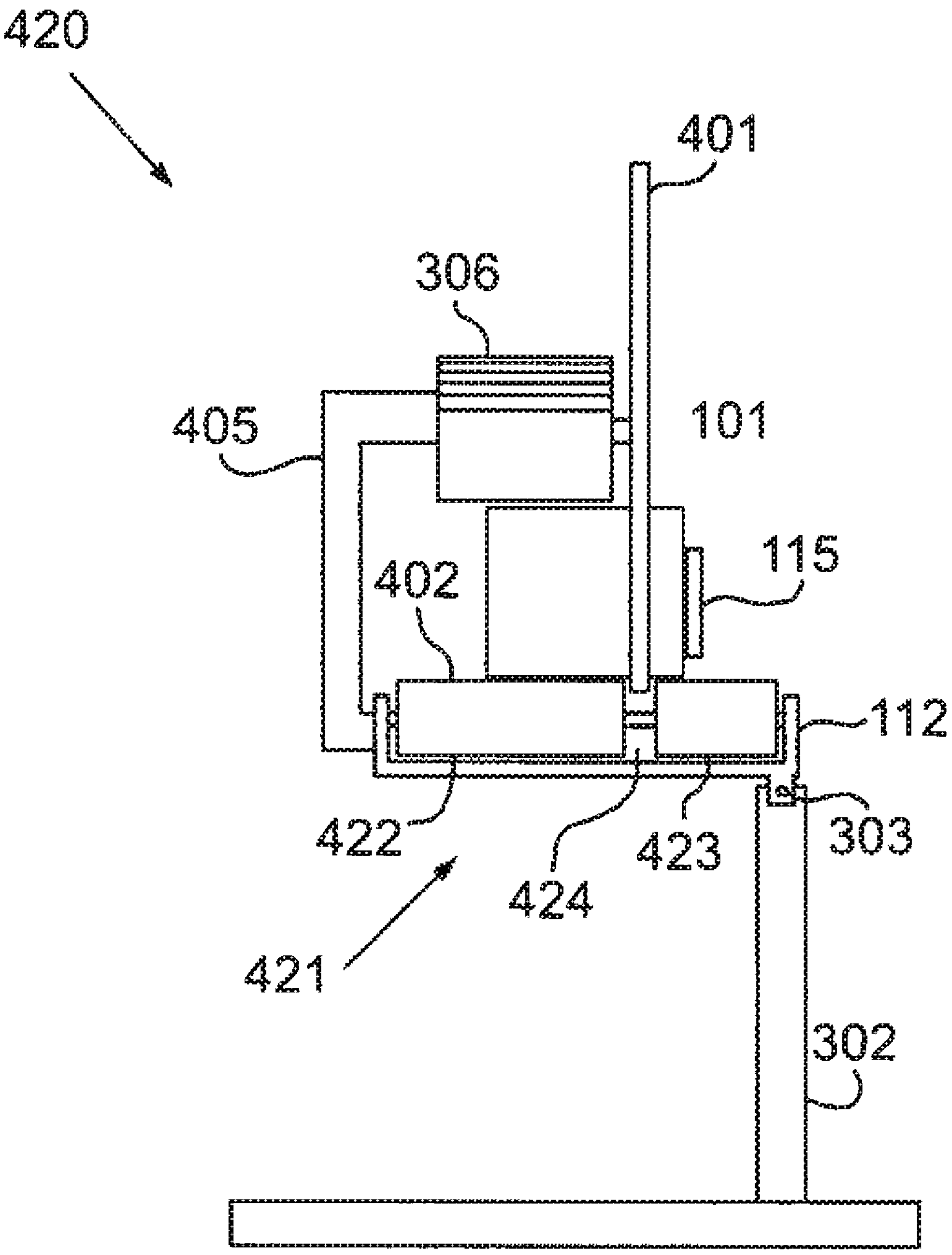
FIG. 4*b* is a front schematic view of a portion of yet another embodiment of a thin veneer stone saw.

In an alternate configuration illustrated in FIG. 4*b*, a thin veneer stone saw 420 may comprise a similar circular saw blade 401, motor 306, and motor support frame 405 configuration as described in FIG. 4*a*. The thin veneer stone saw 420 of FIG. 4*b* includes a conveyor system 421 that comprises two separate conveyors: a first conveyor 422 and a second conveyor 423. The two conveyors 422, 423 are separated by a gap 424. The circular saw blade 401 is disposed within the gap 424 such that a portion of the circular saw blade 401 is disposed below the substantially planar top surface 402 of the conveyor system 421. The gap 424 may be sized, and the circular saw blade 401 may be positioned, such that the circular sawing blade 401 does not come into contact with any portion of the conveyor system 421. In this regard, the thin veneer stone saw 400 may be operable to saw completely through stone blocks 101 without incurring damage to the conveyor system 421 due to contact between the circular saw blade 401 and the conveyor system 421.

Figure 5:
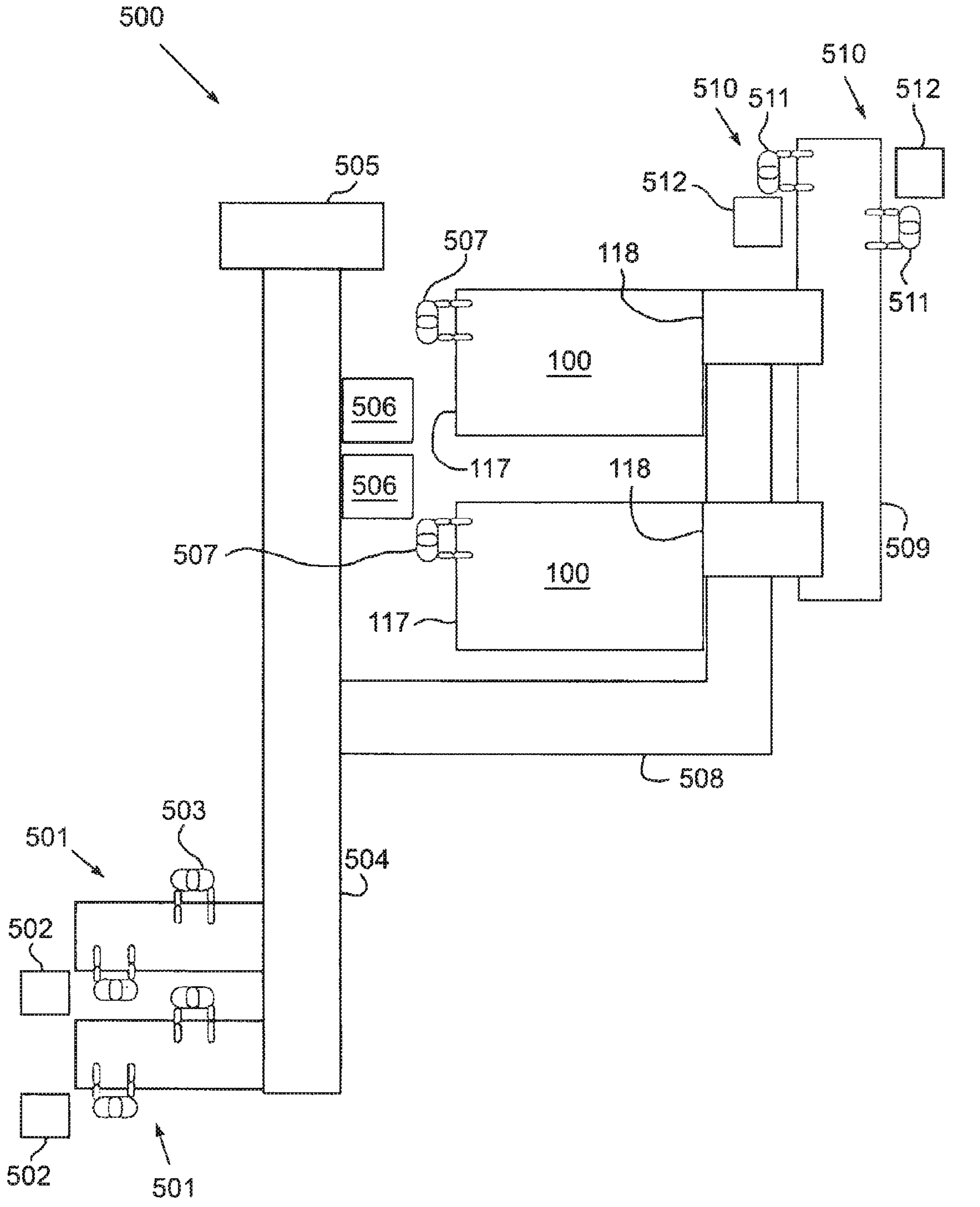
FIG. 5 is a top plan view of a manufacturing system that includes two thin veneer stone saws and supporting conveyors and systems.

The above-described thin veneer stone saws, such as thin veneer stone saw 100, may be incorporated into a manufacturing system such as the manufacturing system 500 illustrated in FIG. 5. The manufacturing system 500 includes two thin veneer stone saws 100. Although two thin veneer stone saws 100 are shown in the manufacturing system 500, other quantities of thin veneer stone saws 100 may be used. The number of thin veneer stone saws 100, as well as the configuration and number of supporting manufacturing systems, may vary from the configuration illustrated in FIG. 5. This variation may be dependent on required production output, manufacturing space availability, and/or any other appropriate manufacturing concern.

The manufacturing system 500 may include incoming material inspection and/or loading stations 501. Raw material 502 (e.g., stone blocks 101) may arrive at and be loaded onto the stations 501. Inspectors 503 may inspect the raw material 502 and forward it to a transport conveyor 504. Raw materials 502 that do not pass the inspection process may be delivered to a scrap hopper 505. Raw materials 502 that do pass the inspection process may be delivered to the thin veneer stone saws 100. The inspected raw materials may be placed onto lift tables 506 for transfer to the thin veneer stone saws 100. The thin veneer stone saw operators 507 may load the inspected raw materials into the feed end 117 of the thin veneer stone saws 100 for sawing. An embodiment of a sawing process is described below. After sawing, the thin veneer stone and the remaining portion of the stone block may exit from the discharge end 118 of the thin veneer stone saws 100. The remaining portion of the stone block may be placed on a return conveyor 508. The remaining portion of the stone lock may be conveyed back to the feed end 117 of the thin veneer stone saws 100 for additional sawing. If no more thin veneer stones are to be sawed from the remaining portion of the stone block, the remaining portion of the stone block may be delivered to the scrap hopper 505.

The thin veneer stones exiting from the discharge ends 118 may be delivered via a finished goods conveyor 509 to final inspection and/or packaging stations 510. Packaging station personnel 511 may inspect and/or package the thin veneer stones. The thin veneer stones may be placed on palettes and/or in boxes 512.

Other appropriate handling, transporting, and manufacturing systems may be utilized in the manufacturing system 500. For example, any of the manual processes described may be automated. For example, mechanical equipment to assist the operators in lifting and/or handling the raw materials 502, in process materials, or finished goods may be utilized.

An embodiment of a sawing process utilizing the thin veneer stone saw of FIG. 1 will now be described. The sawing process may include various set up and production steps. A first step may be to adjust the distance between the sawing plane of the circular saw blades 107, 110 and the fence 115 to correspond with the desired thickness of the thin veneer stone to be produced. The position of the fence 115 may be adjusted manually. Alignment guides (e.g., infrared alignment guides, graduated scales) may be used to obtain the desired position of the fence 115.

Using a control panel of the thin veneer stone saw 100, the operator may then turn on the thin veneer stone saw 100. A valve or valves that control the delivery of water to the water nozzles may then be activated. Next, the type of stone to be processed may be entered into the control panel and the corresponding proper rotational speed of the circular saw blades 107, 110 may be set. This may be followed by determining the dimensions of the stone to be sawed and setting the height of the circular saw blades 107, 110 accordingly. The angle of tilt of the conveyor system 103 may then be entered into the control panel and the thin veneer stone saw 100 may then automatically tilt the conveyor system 103 to the inputted angle. The stone block 101 may then be placed on the conveyor system 103. The stone block 101 may be positioned so that it is adjacent to the fence 115. The stone block 101 may also be aligned using an alignment system (e.g., an infrared alignment system).

The stone block 101 may then be conveyed along the conveyor system 103. As the stone block 101 is conveyed, it may first come into contact with, and be sawed by, the lower circular saw blade 107. As the stone block 101 continues along the conveyor system 103 it may also come into contact with, and be sawed by, the upper circular saw blade 110. The stone block 101 may continue along the conveyor system 103 until it has been sawed into a thin veneer stone and a remaining portion. During the sawing process, various parameters of the thin veneer stone saw 100 may be adjusted. For example, if the rotational speed of the circular saw blades 107, 110 drops below a predetermined level, the thin veneer stone saw 100 may reduce the speed of the conveyor system 103 to compensate.

The thin veneer stone and the remaining portion may be separated by the separation blade as the thin veneer stone and remaining portion continue along the conveyor system 103. The thin veneer stone may then be delivered to a packaging and/or inspection area. The remaining portion may be returned to the feed end 117 of the thin veneer stone saw 100, or it may be removed from the manufacturing process (e.g., as scrap).

The thin veneer stonecutting process has been described in terms of processing a single stone block 101. However it will be appreciated that a series of stone blocks may be processed using the above described steps. For example, a series of stone blocks 101 may be sequentially loaded onto the thin veneer stone saw 100 and sequentially processed. Furthermore, it will be appreciated that the sequence of some of the described steps may be rearranged and that some of the steps that have been described as being performed automatically may be performed manually and vice versa.

While various embodiments of the present invention have been described in detail, it is apparent that further modifications and adaptations of the invention will occur to those skilled in the art. For example, methods and systems for sawing stone blocks are generally described herein with respect to producing a thin veneer stone. However, the systems and methods could be used with other forms of masonry in other configurations. However, it is to be expressly understood that such modifications and adaptations are within the spirit and scope of the present invention.

What is claimed:

1. A quick release mechanism for interconnecting a driven member to a rotating member; said quick release mechanism comprising:

a bearing surface fixedly interconnected to said rotating member;

a shaft fixedly interconnected to said rotating member;

a cam plate, wherein said cam plate is disposed a fixed distance away from said bearing surface;

an adjustable plate, wherein said adjustable plate is disposed between said bearing surface and said cam plate, wherein a distance from said adjustable plate to said cam plate is adjustable;

a clamp base, wherein said clamp base is selectably fixable to said shaft;

a cam arm pivotably interconnected to said clamp base, wherein when said clamp base is fixed to said shaft, said cam arm is operable to pivot a cam from a first position where said cam is not in contact with said cam plate to a second position where said cam is in contact with said cam plate; and a cam movement prevention member operable to selectably prevent said cam from moving relative to said cam plate when said cam is in said second position.

2. The quick release mechanism of claim 1, wherein said bearing surface includes an alignment pin operable to align said driven member with said rotating member.

3. The quick release mechanism of claim 1, wherein said shaft includes two holes spaced from, and lying in a plane parallel to, a plane containing a longitudinal axis of said shaft.

4. The quick release mechanism of claim 1, wherein in said second position said cam exerts a force on said cam plate when said driven member is disposed between said adjustable plate and said bearing surface.

5. The quick release mechanism of claim 1, wherein said driven member is a saw blade.

6. The quick release mechanism of claim 5, wherein said saw blade is a stone saw blade.

* * * * *